(12) United States Patent
Doi (10) Patent No.: US 8,824,001 B2
(45) Date of Patent: Sep. 2, 2014

(54) PRINTING METHOD, PRINTING APPARATUS, AND MEDIUM

(75) Inventor: Takashi Doi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 13/551,870

(22) Filed: Jul. 18, 2012

(65) Prior Publication Data

US 2013/0021620 A1   Jan. 24, 2013

(30) Foreign Application Priority Data

Jul. 19, 2011  (JP) ................ 2011-158128
Dec. 27, 2011  (JP) ................ 2011-285311
May 1, 2012  (JP) ................ 2012-104695

(51) Int. Cl.
*G06F 15/00* (2006.01)

(52) U.S. Cl.
USPC .................................................. 358/1.2

(58) Field of Classification Search
USPC ............................................... 358/1.2, 1.12
See application file for complete search history.

(56) References Cited

U.S. PATENT DOCUMENTS

| 6,418,281 | B1 * | 7/2002 | Ohki ..................... 399/49 |
| 2002/0030832 | A1 | 3/2002 | Shibuya et al. |
| 2003/0016263 | A1 | 1/2003 | Takahashi et al. |
| 2005/0001870 | A1 | 1/2005 | Komatsu |

FOREIGN PATENT DOCUMENTS

| JP | 2000-127370 A | 5/2000 |
| JP | 2000-209450 A | 7/2000 |
| JP | 2002-044455 A | 2/2002 |
| JP | 2003-341030 A | 12/2003 |
| JP | 2004-330497 A | 11/2004 |
| JP | 2005-059552 A | 3/2005 |
| JP | 2005-059553 A | 3/2005 |
| JP | 2005-067093 A | 3/2005 |
| JP | 2005-262757 A | 9/2005 |
| JP | 2005-329701 A | 12/2005 |
| JP | 2006-069099 A | 3/2006 |
| JP | 2008-153835 A | 7/2008 |
| JP | 2010-201845 A | 9/2010 |
| JP | 2012-504060 A | 2/2012 |
| WO | 2010-039183 A1 | 4/2010 |

* cited by examiner

*Primary Examiner* — Saeid Ebrahimi Dehkordy
(74) *Attorney, Agent, or Firm* — Nutter McClennen & Fish LLP; John J. Penny, Jr.

(57) ABSTRACT

A printing method includes forming on a medium a test pattern including a first patch, a second patch, and a plurality of patches interposed between the first patch and the second patch in such a way that the patches are aligned in a predetermined direction, scanning the test pattern with an optical sensor along the predetermined direction. Widths of the first and second patches in the predetermined direction and widths thereof in an intersectional direction intersecting the predetermined direction are greater than a spot size of the optical sensor. The width of each of the plurality of patches in the intersectional direction is greater than the spot size, and the width of each of the plurality of patches in the predetermined direction is smaller than the spot size.

20 Claims, 6 Drawing Sheets

PRINTING METHOD, PRINTING APPARATUS, AND MEDIUM

BACKGROUND

1. Technical Field

The present invention relates to a printing method, a printing apparatus, and a medium.

2. Related Art

A lot of color printers capable of rendering a plurality of colors are in use. Such a color printer carries out color calibration to improve color reproducibility. In executing color calibration, a test pattern for color calibration is printed. Then, the test pattern is measured to acquire a measured value in color space, and deviation of colors to be output by the printer is compensated based on the result of the measurement.

JP-A-2010-201845 is an example of related art.

A plurality of patches whose gray-scale values are varied are formed on the test pattern for each of colors used in the printer. A compensation value for each color is acquired based on the results of reading the gray-scale values of the patches. When the patch size is made smaller in such a test pattern, reading the gray-scale value of the patch is influenced by the color around the patch (e.g., white color of a sheet), preventing accurate reading of the gray-scale value. When measurement is carried out with an optical sensor, in particular, it is difficult to achieve highly accurate measurement. When the patch size is increased, on the other hand, the entire area of a test pattern becomes larger, undesirably increasing the print area.

SUMMARY

Accordingly, an advantage of some aspects of the invention is to achieve both reduction in the print area of a test pattern and high accuracy in density measurement.

To bring about the advantage, according to an aspect of the invention, there is provided a printing method including forming on a medium a test pattern including a first patch with a first gray-scale value, a second patch with a second gray-scale value, and a plurality of patches interposed between the first patch and the second patch and having gray-scale values varying between the first gray-scale value and the second gray-scale value in such a way that the patches are aligned in a predetermined direction, scanning the test pattern with an optical sensor along the predetermined direction, and performing density compensation based on a result of scanning the test pattern, wherein widths of the first and second patches in the predetermined direction and widths thereof in an intersectional direction intersecting the predetermined direction are greater than a spot size of the optical sensor, and the width of each of the plurality of patches in the intersectional direction is greater than the spot size, and the width of each of the plurality of patches in the predetermined direction is smaller than the spot size.

Additional aspects of the invention may be appreciated from a review of the following detailed description of the invention, along with the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

At least the following matters will be appreciated from the following detailed description of the invention and the accompanying drawings.

First Application Example

A printing method includes forming on a medium a test pattern including a first patch with a first gray-scale value, a second patch with a second gray-scale value, and a plurality of patches interposed between the first patch and the second patch and having gray-scale values varying between the first gray-scale value and the second gray-scale value in such a way that the patches are aligned in a predetermined direction, scanning the test pattern with an optical sensor along the predetermined direction, and performing density compensation based on a result of scanning the test pattern, wherein widths of the first and second patches in the predetermined direction and widths thereof in an intersectional direction intersecting the predetermined direction are greater than a spot size of the optical sensor, and the width of each of the plurality of patches in the intersectional direction is greater than the spot size, and the width of each of the plurality of patches in the predetermined direction is smaller than the spot size.

Because the first patch and the second patch positioned at end portions in a predetermined direction are greater than the spot size of the optical sensor according to this printing method, accurate values can be measured without being influenced by the surrounding. In addition, the widths of a plurality of patches interposed between the first patch and the second patch in the predetermined direction are smaller than the spot size, and the gray-scale values of the plurality of patches are varied. Accordingly, sampling at finer periods can ensure acquisition of continuous density data, so that even the optical sensor can achieve highly accurate measurement as a consequence. It is therefore possible to achieve both reduction in the print area of a test pattern and high accuracy in density measurement.

Second Application Example

A printing method may include forming on a medium a test pattern including a first patch with a first gray-scale value, a second patch with a second gray-scale value, and a plurality of patches interposed between the first patch and the second patch and having gray-scale values varying between the first gray-scale value and the second gray-scale value in such a way that the patches are aligned in a predetermined direction, scanning the test pattern with an optical sensor along the predetermined direction, and performing density compensation based on a result of scanning the test pattern, and the test pattern may be formed for each of inks of a plurality of colors, and the number of the plurality of patches may be changed each color of the inks of the plurality of colors.

According to this printing method, the gray-scale values of the first and second patches and the plurality of patches are varied. Accordingly, sampling at finer periods can ensure acquisition of continuous density data, so that even the optical sensor can achieve highly accurate measurement as a consequence. In addition, it is possible to reduce consumption of inks and the medium by the reduced number of patches. This makes it possible to achieve both reduction in the print area of a test pattern and high accuracy in density measurement.

Third Application Example

A printing method may include forming on a medium a test pattern including a first patch with a first gray-scale value, a second patch with a second gray-scale value, and a plurality of patches interposed between the first patch and the second patch and having gray-scale values varying between the first gray-scale value and the second gray-scale value in such a way that the patches are aligned in a predetermined direction, scanning the test pattern with an optical sensor along the predetermined direction, and performing density compensation based on a result of scanning the test pattern, the test pattern may be formed for each color of the inks of the plurality of colors, and at least one of the first gray-scale value and the second gray-scale value may be changed each color of the inks of the plurality of colors.

According to this printing method, the gray-scale values of the first and second patches and the plurality of patches are varied. Accordingly, sampling at finer periods can ensure acquisition of continuous density data, so that even the optical sensor can achieve highly accurate measurement as a consequence. In addition, it is possible to reduce consumption of inks and the medium by an amount corresponding to the gray-scale values for which the test pattern is not formed. This makes it possible to achieve both reduction in the print area of a test pattern and high accuracy in density measurement.

Fourth Application Example

It is desirable that the printing method according to any one of the first to third application examples should further include forming a width-determining pattern at least one of whose width in the predetermined direction and whose width in the intersectional direction changes gradually, scanning the width-determining pattern with the optical sensor along the predetermined direction, and respectively determining widths of the test pattern which correspond to the first patch or the second patch based on a result of scanning the width-determining pattern.

A width which is suitably scanned with the optical sensor (as small a value as possible without being influenced by the surrounding) can be obtained beforehand according to this printing method, so that a patch of an excessively large size need not be formed.

Fifth Application Example

It is desirable that in the printing method according to any one of the first to fourth application examples, the width-determining pattern should be formed with an ink of a color other than a color which provides a smallest range of a change in the result of scanning with the optical sensor among a plurality of inks to be used in printing.

This printing method can improve the accuracy of reading the gray-scale values.

Sixth Application Example

It is desirable that in the printing method according to any one of the first to fifth application examples, the individual widths of the first patch and the second patch should be changed according to a type of the medium.

This printing method can make the reading accuracy stable even if the focal distance and the spot size of the optical sensor are varied.

Seventh Application Example

In the printing method according to any one of the first to sixth application examples, the test pattern may be formed for each of inks of a plurality of colors, and a number of the plurality of patches may be changed among some colors.

According to this printing method, it is possible to reduce consumption of inks and the medium by the reduced number of patches.

Eighth Application Example

In the printing method according to any one of the first to seventh application examples, the test pattern may be formed for each of a plurality of dot sizes.

Ninth Application Example

In the printing method according to any one of the first to eighth application examples, a plurality of test patterns may be formed in alignment in the predetermined direction, and a number of the plurality of test patterns aligned in the predetermined direction may be changed according to a type or a size of the medium.

Tenth Application Example

In the printing method according to any one of the first to ninth application examples, the test pattern may be formed for each color of inks of a plurality of colors, and the widths of the plurality of patches in the predetermined direction may be changed among some colors.

According to this printing method, it is possible to reduce consumption of inks and the medium by an amount corresponding to the narrowed widths of the patches.

Eleventh Application Example

In the printing method according to any one of the first to tenth application examples, the test pattern may be formed for each of inks of a plurality of colors, and at least one of the first gray-scale value and the second gray-scale value may be changed among some colors.

According to this printing method, it is possible to reduce consumption of inks and the medium by an amount corresponding to the gray-scale values for which the test pattern is not formed.

Twelfth Application Example

It is desirable that in the printing method according to any one of the first to eleventh application examples, a number of gray-scale values of the test pattern scanned by the optical sensor should be greater than a number of gray-scale values of a pattern for colorimetry with a colorimeter.

This printing method can improve the reading accuracy by reading a greater number of gray-scale values than those read by the colorimeter.

Thirteenth Application Example

It is desirable that in the printing method according to any one of the first to twelfth application examples, the width of each of the plurality of patches in the intersectional direction should be greater than a width corresponding to a sampling period of the optical sensor.

This printing method can improve the accuracy of reading the gray-scale value for each of a plurality of patches.

A printing apparatus which executes any one of the printing methods according to the first to thirteenth application examples will be appreciated from the following detailed description of the invention and the accompanying drawings. For example, a printing apparatus mentioned below will also be appreciated.

Fourteenth Application Example

A printing apparatus includes a head that ejects an ink, an optical sensor, and a control section that controls the head and the optical sensor, wherein the head forms a test pattern including a first patch with a first gray-scale value, a second patch with a second gray-scale value, and a plurality of patches interposed between the first patch and the second patch and having gray-scale values varying between the first gray-scale value and the second gray-scale value is formed on a medium in such a way that the patches are aligned in a predetermined direction, the optical sensor scans the test pattern along the predetermined direction, the control section carries out printing based on a result of density compensation performed by a result of scanning the test pattern, widths of the first and second patches in the predetermined direction and widths thereof in an intersectional direction intersecting the predetermined direction are greater than a spot size of the optical sensor, and the width of each of the plurality of patches in the intersectional direction is greater than the spot size, and the width of each of the plurality of patches in the predetermined direction is smaller than the spot size.

Further, a program allowing a computer to execute any one of the foregoing printing methods, and a medium recording the program will be appreciated from the following detailed description of the invention and the accompanying drawings.

First Embodiment

Printer

A printer 1 according to the embodiment ejects ink droplets on a sheet to form an image thereon. The printer 1 according to the embodiment includes nozzles to eject inks of a plurality of colors. The printer 1 alternately repeats a transportation operation of intermittently transporting a print medium (e.g., sheet) in a transporting direction (equivalent to "intersectional direction" as used in an aspect of the invention), and a dot forming operation (hereinafter also referred to as "path") of ejecting inks while moving the head in a direction orthogonal to the transporting direction (hereinafter also referred to as "moving direction" and equivalent to "predetermined direction" as used in the aspect). This allows an image to be formed by collections of inks landed on the print medium.

The printer 1 according to the embodiment can eject seven types of inks of cyan (C), light cyan (LC), magenta (M), light magenta (LM), yellow (Y), black (K) and light black (LK).

Although the inks of the aforementioned seven colors are used according to the embodiment, the types of colors are not restrictive. Further, inks in use may be pigmented inks each mixed with a color material formed of a pigment, or dye inks each mixed with a color material formed of a dye.

Such a printer has the head mounted on a carriage that is movable in the moving direction (which will be discussed later). A reflection type optical sensor (hereinafter also simply referred to as "optical sensor") to be discussed later is provided on the carriage. As the carriage moves in the moving direction, therefore, the head and the optical sensor also move in the moving direction. The optical sensor is mounted on the carriage at a position downstream of the head in the transporting direction. When the carriage moves in the moving direction (also referred to as "main scanning direction"), therefore, the optical sensor moves on an image (pattern) formed by the head along the moving direction.

Figure 6:
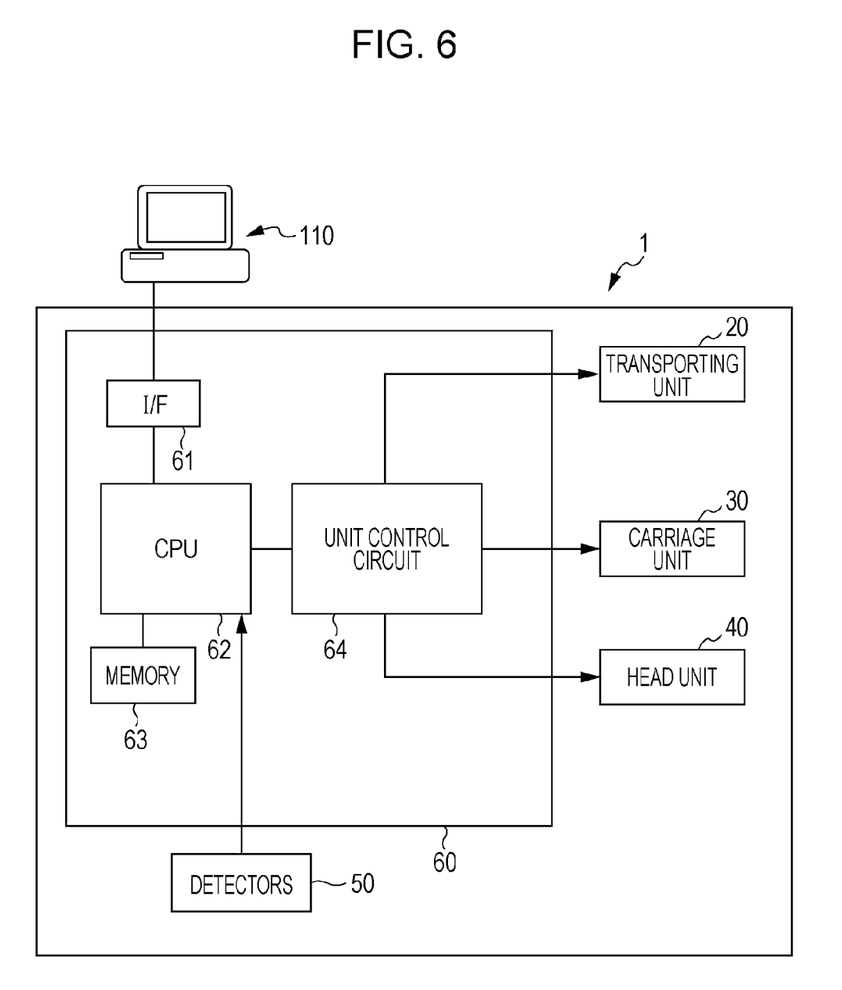
FIG. 6 is a block diagram of the general configuration of a printer.

FIG. 6 is a block diagram of the general configuration of the printer 1.

The printer 1 includes a transporting unit 20, a carriage unit 30, a head unit 40, detectors 50, and a controller 60. Upon reception of print data from a computer 110 which is an external apparatus, the printer 1, controls the individual units (transporting unit 20, carriage unit 30 and head unit 40) using the controller 60. The conditions in the printer 1 are monitored by the detectors 50, which output detection results to the controller 60.

The transporting unit 20 transports a print medium (sheet S) in the transporting direction. The transporting unit 20 includes a roll drive mechanism, a transporting motor, a transporting roller pair, a platen, and a discharge roller pair (not shown). The transporting roller pair is provided upstream of a printable area (print area) in the transporting direction. The discharge roller pair is provided downstream of the print area in the transporting direction. The transporting roller pair has a transporting roller and a driven roller. The discharge roller pair has a discharge roller and a driven roller.

The roll drive mechanism (not shown) drives (rotates) a core T clockwise or counterclockwise to assist transportation of a sheet S and adjust looseness of the sheet S (i.e., adjust the tension of the sheet S). The transporting roller which transports the sheet S in the transporting direction is driven by the transporting motor. The platen is provided at a position in the print area which faces the head. The platen supports the sheet S during printing. The discharge roller discharges the sheet S after printing outside the printer 1 (sheet discharge).

The carriage unit 30 moves the head in the moving direction. The intersectional direction is generally an orthogonal direction. The carriage unit 30 has a carriage and a carriage motor (also called "CR motor") (not shown). The carriage reciprocatable in the moving direction, and is driven by the carriage motor. The carriage detachably holds an ink cartridge retaining inks.

The head unit 40 ejects inks on the sheet S. The head unit 40 includes the head having a plurality of nozzles. Because the head is mounted on the carriage, the head moves in the moving direction as the carriage moves in the moving direction. Then, as the head intermittently ejects inks while moving in the moving direction, dot lines (raster lines) along the moving direction are formed on the sheet.

The detectors 50 includes a linear encoder, a rotary encoder, and the optical sensor 10 (which will be described later). The linear encoder detects the position of the carriage in the moving direction. The rotary encoder detects the amount of rotation of the transporting roller (i.e., the amount of transportation of the sheet S). The optical sensor 10 detects the position of the leading end of the sheet S and the width of the sheet S. The optical sensor 10 also detects the density on the surface (print surface) of the sheet S. That is, the optical sensor 10 is equivalent to a density sensor.

The controller 60 is a control unit (control section) to control the printer 1. The controller 60 includes an interface unit 61, a CPU 62, a memory 63, and a unit control circuit 64. The interface unit 61 effects data transmission/reception between the computer 110 as an external apparatus and the printer 1. The CPU 62 is a processing unit to execute the general control of the printer 1. The memory 63 provides an area for storing a program for the CPU 62, a work area therefor, etc., and has memory elements, such as RAM and EEPROM. The CPU 62 controls the individual units through the unit control circuit 64 according to the program stored in the memory 63.

Configurational Example of Optical Sensor

Figure 1:
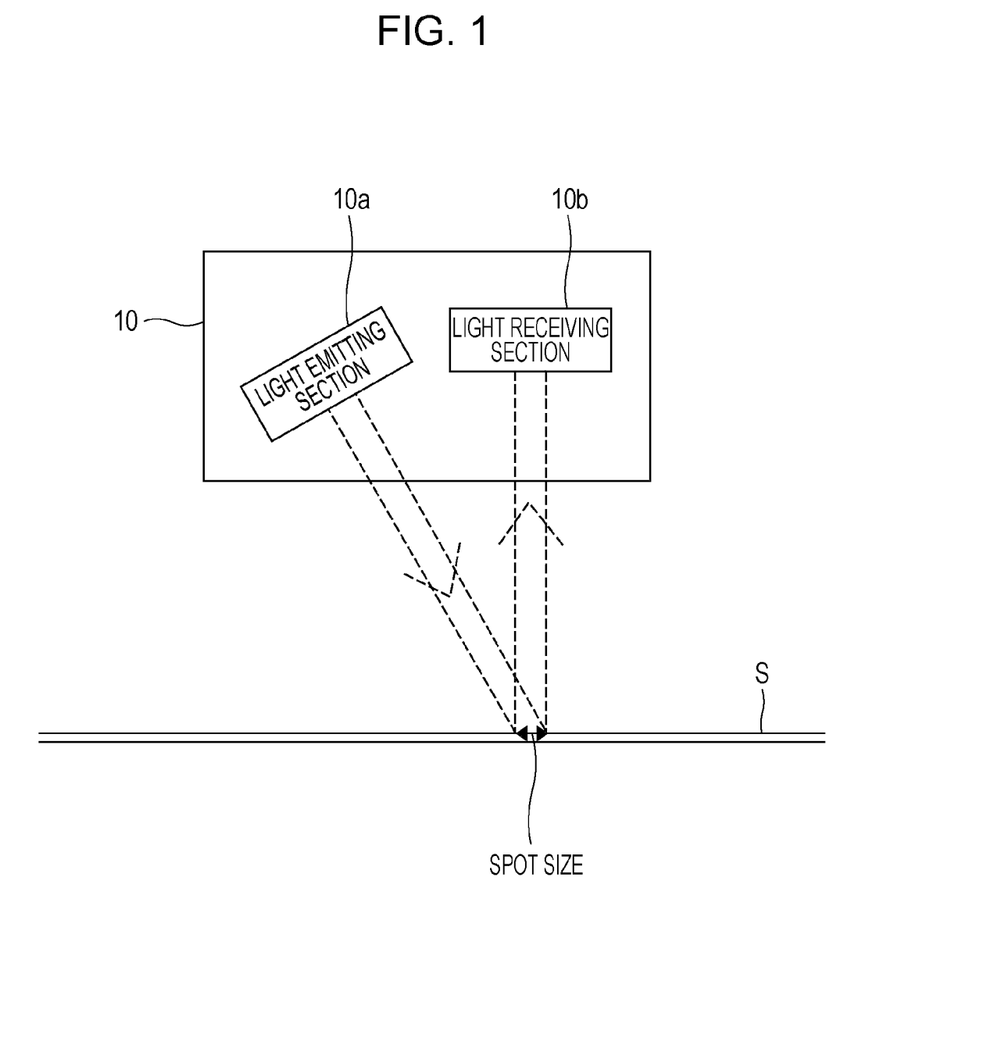
FIG. 1 is an explanatory diagram exemplarily illustrating the configuration of a reflection type optical sensor according to an exemplary embodiment.

FIG. 1 is an explanatory diagram exemplarily illustrating the configuration of the optical sensor according to the embodiment. The embodiment uses an optical sensor configured in such a way that the direction of a light emitting section is set to irradiate irradiation light obliquely to the surface of the print medium (sheet S in this example). However, the optical sensor in use is not limited to such a configuration, and may be configured in such a way that the direction of the light emitting section is set to irradiate irradiation light perpendicularly to the surface of the print medium.

The optical sensor 10 according to the embodiment as shown in FIG. 1 includes a light emitting section 10a and a light receiving section 10b. Although a single light receiving section for mainly receiving the diffused reflection components of reflection light is provided as the light receiving section 10b according to the embodiment, the optical sensor 10 may be configured to be provided with another light receiving section for mainly receiving the regular reflection components of reflection light.

The light emitting section 10a is a light emitting device for irradiating light toward the print medium (sheet S). An arbitrary light emitting device, such as a light emitting diode, a laser diode or an incandescent lamp, may be used as the light emitting section 10a. An area on the sheet S which is irradiated with irradiation light from the light emitting section 10a when the irradiation light is focused on the surface of the sheet S is called "spot". The diameter of the spot is called "spot size".

The light receiving section 10b is a photoelectric converting device that detects reflection light reflected at the sheet S, and converts the reflection light to an electric signal. A photodiode, a phototransistor or the like may be used as the light receiving section 10b.

When diffused reflection components are mainly received as in the embodiment, it is desirable that the light receiving section 10b should not be positioned in the position of regular reflection with respect to the light emitting section 10a. As shown in FIG. 1, for example, the direction of the light emitting section 10a should be set so that irradiation light from the light emitting section 10a is irradiated obliquely to the surface of the sheet S, and the direction of the light receiving section 10b should be set so as to detect reflection light perpendicular to the surface of the sheet S. Alternatively, as mentioned above, the direction of the light emitting section 10a may be set so that irradiation light from the light emitting section 10a is irradiated perpendicularly to the surface of the sheet S, and the direction of the light receiving section 10b may be set so as to detect reflection light reflected obliquely from the surface of the sheet S.

The foregoing configuration permits irradiation light emitted from the light emitting section 10a to be reflected at the sheet S so that diffused reflection components of the reflection light reach the light receiving section 10b. The intensity of the reflection light depends on the color density at the position of reflection on the sheet S. The light receiving section 10b generates an electric signal according to the intensity of the reflection light, and sends the electric signal as an output signal to the controller 60. Therefore, the optical sensor 10 serves as a unit of reading the density of a pattern formed on the sheet S (i.e., acquiring a read gray-scale value).

Such an optical sensor 10 has a feature such that the sampling period can be set finely as compared to a colorimeter.

Density Calibration

Printers have color output characteristics slightly different from one another among the printers. To compensate for the difference too improve the color reproducibility of the printer 1, density calibration (gray-scale compensation) is carried out. In executing density calibration, a test pattern is printed. A plurality of patches respectively having different gray-scale values are formed on the test pattern for each color (ink color) used by the printer 1. A compensation value for compensating for the density (hereinafter also referred to as "density compensation value") for the gray-scale value of each color based on the result of reading the gray-scale value of each of the patches.

In case of measuring the gray-scale values with the above-described optical sensor 10, for example, it is necessary to increase the number of gray scales to be measured in order to achieve measurement at higher accuracy. Specifically, when the number of the gray scales of a pattern to be measured by the colorimeter is 33, for example, 125 gray scales are needed for the optical sensor 10 to acquire accuracy equivalent to the accuracy of the colorimeter. This increases the number of patches to be printed, undesirably increasing the area needed to print a test pattern.

When the size of each patch on the test pattern is made smaller to reduce the print area, on the other hand, measured values are likely to be deviated as a consequence of the influence of, for example, a non-printed portion (white portion) of the sheet S. That is, highly accurate measurement may not be achieved.

According to the embodiment, the test pattern is designed so that the optical sensor 10 can carry out highly accurate measurement while suppressing the size of the print area as will be discussed later.

Density Calibration According to the Embodiment

According to the invention, two processes, namely a width determining routine and a compensation value acquiring routine, are carried out in executing density calibration. The width determining routine is a process of determining the size of a patch of an end portion of a test pattern. The compensation value acquiring routine is a process of printing a test pattern of the size determined in the width determining routine, and measuring the density of the test pattern with the optical sensor 10 to thereby calculate a density compensation value. According to the embodiment, the test pattern is formed in gradation so that the gray-scale values continuously change. Consecutive density data sampled at finer periods by the optical sensor 10 is acquired, resulting in achievement of highly accurate measurement. The individual routines will be described below. The main part that executes the operation discussed below is the controller 60 (control section) of the printer 1. The controller 60 controls the individual units of the printer 1 according to the program stored in the memory 63 or the like to execute the following individual routines.

Width Determining Routine

Figure 2A:
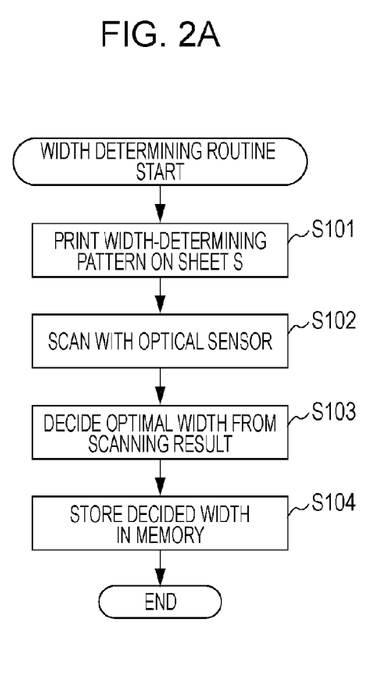
FIG. 2A is a flowchart illustrating an example of a width determining routine according to the embodiment.
Figure 3:
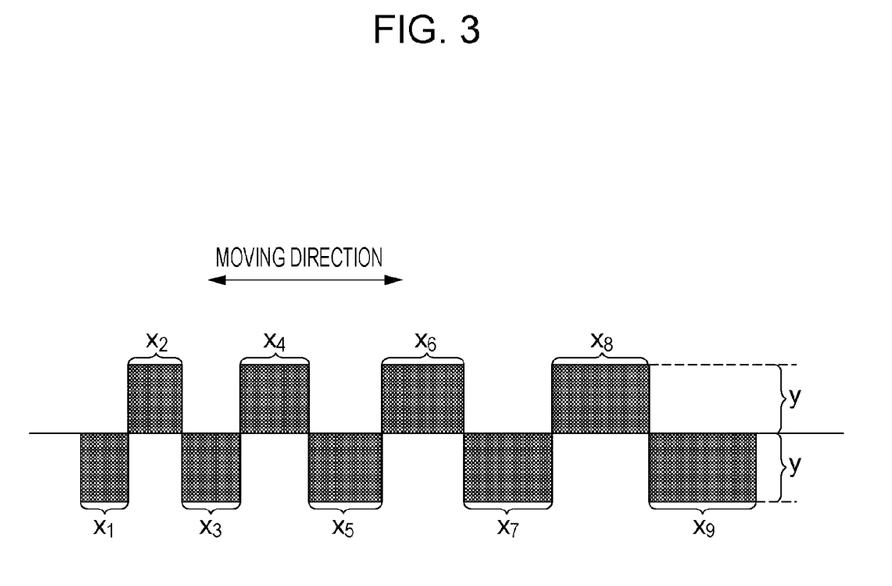
FIG. 3 is a diagram illustrating an example of a width-determining pattern according to the embodiment.

FIG. 2A is a flowchart illustrating an example of the width determining routine. FIG. 3 is a diagram illustrating an example of a width-determining pattern according to the embodiment. It is assumed that according to the embodiment, the width determining routine discussed below is executed in an inspection process in a factory where the printer 1 is manufactured.

First, the sheet S is set in the printer 1. The controller 60 transports the sheet S to the print area, and then ejects black ink from the head to print a width-determining pattern on the sheet S at the time the head moves (S101). The width-determining pattern according to the embodiment has a pattern of white (no dots formed) areas and a pattern of black (dots formed) areas alternately aligned in a checkered fashion in the moving direction as shown in FIG. 3. Each pattern has a constant width (y) in the transporting direction, and a width (x) varying stepwise in the moving direction. More specifically, the width x of each pattern becomes larger rightward in FIG. 3 ($x_1 < x_2 < x_3 \ldots < x_9$). According to the embodiment, an ink of black (K) in the aforementioned seven colors is used for the test pattern. This is because the range of a change in black (i.e., difference between the maximum value and the minimum value) is greater than the ranges of changes in other colors, the reading accuracy is higher. Although black ink is used for the test pattern according to the embodiment, it is not restrictive, and the pattern shown in FIG. 3 may be printed in a color (e.g., cyan) other than black. It is however desirable that the width-determining pattern should be formed in a color (e.g., yellow) having the smallest range of color change.

When the width-determining pattern formed on the sheet S is transported to the position that faces the optical sensor 10, the controller 60 causes the optical sensor 10 to scan the width-determining pattern (S102 in FIG. 2A). The controller 60 then determines the patch width (width x in the moving direction) where a white area and a black area adjoining each other can be scanned without being influenced from each other (S103). The patch width determined this way is stored in the memory 63 or the like (S104).

According to the embodiment, a checkered pattern with the fixed width (y) in the transporting direction and the width (x) varying stepwisely in the moving direction is formed, and the optimal value of the width (x) in the moving direction is determined. However, the optimal value of the width (x) in the transporting direction may be determined similarly. Specifically, a width-determining pattern (not shown) with the fixed width (x) in the moving direction and the width (y) varying stepwisely in the transporting direction should be printed, and should be scanned by the optical sensor 10. In this case, the optimal patch width (y) can be determined similarly. Alternatively, a checkered pattern with the width (y) in the transporting direction and the width (x) in the moving direction both varying stepwisely may be formed. The width (y) in the transporting direction and the width (x) in the moving direction which are not influenced by the surrounding are determined based on the result of scanning the width-determining pattern with the optical sensor 10. According to the embodiment, the spot size of the optical sensor 10 is set to 3 mm, and the width (x) in the moving direction and the width (y) in the transporting direction are respectively set to 5 mm and 8 mm based on the result of scanning the patterns or the like in FIG. 3. That is, the widths x and y are both greater than the spot size of the optical sensor 10.

It is desirable that the width determining routine should be set for each of the types of the sheet S subjected to the compensation value acquiring routine. This is because the thickness of the sheet S varies according to the type of the sheet S, changing the focal distance of light from the optical sensor 10 (i.e., spot size). Changing the widths x, y according to the type of the sheet S makes it possible to ensure stable reading accuracy even if the focal distance varies according to the thickness of the sheet S.

Although the foregoing work of determining the width is carried out in the inspection process in a printer manufacturing factory according to the embodiment, it is not restrictive. For example, the width determining work may be carried out by a user as setting prior to calibration. In this case, the width determining routine may be carried out in the compensation value acquiring routine to be described later after the type and size of the sheet S are determined by the user.

Compensation Value Acquiring Routine

Figure 2B:
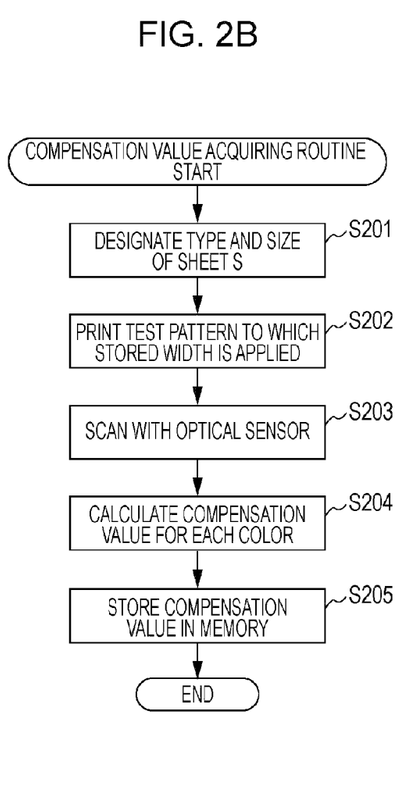
FIG. 2B is a flowchart illustrating an example of a compensation value acquiring routine according to the embodiment.
Figure 4:
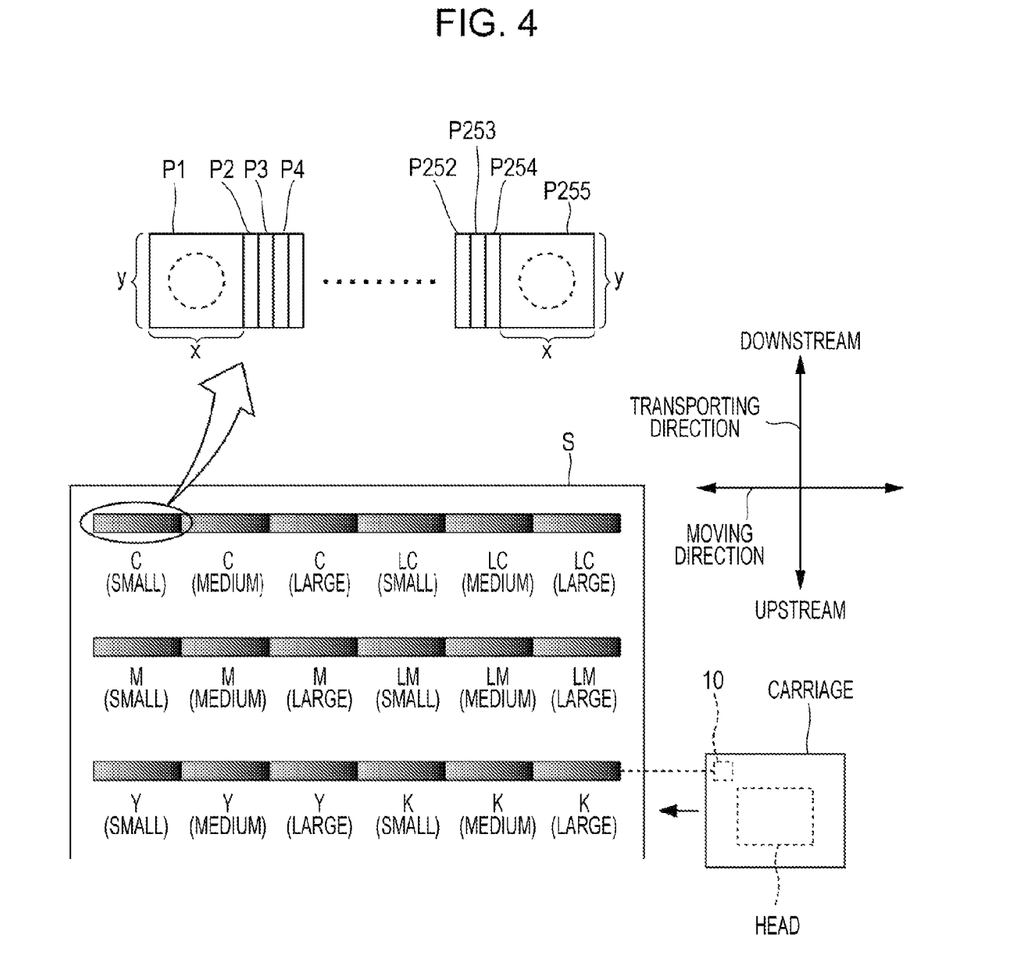
FIG. 4 is a schematic diagram illustrating a test pattern which is formed in the compensation value acquiring routine according to the embodiment.

FIG. 2B is a flowchart illustrating an example of the compensation value acquiring routine according to the embodiment. FIG. 4 is a schematic diagram illustrating a test pattern which is formed in the compensation value acquiring routine according to the embodiment. The upper figure in FIG. 4 illustrates a pattern of a certain color (cyan in this example) in enlargement. In FIG. 4, x and y are values determined in the foregoing width determining routine, and x=5 mm and y=8 mm as mentioned above according to the embodiment. Dotted circles shown in the patches at both ends each indicate the size of the spot of the optical sensor 10. According to the embodiment, the diameter of the spot (i.e., spot size) is 3 mm. As illustrated in FIG. 4, this pattern has a patch formed for each gray-scale value. For example, P1 in FIG. 4 represents a patch with an input gray-scale value of 1 (equivalent to the first patch with the first gray-scale value in the aspect), and P255 represents a patch with an input gray-scale value of 255 (equivalent to the second patch with the second gray-scale value in the aspect). Patches P2 to P254 interposed between the patches (P1, P255) at both ends (equivalent to a plurality of patches in the aspect) have input gray-scale values continuously varying, and have the same width in the transporting direction as y, and the width in the moving direction set smaller than x. More specifically, the widths of the patches P2 to P254 in the moving direction are smaller (e.g., 1 mm) than the spot size of the optical sensor 10. Even if multiple patches are aligned in the moving direction, it is possible to suppress enlargement of the print area.

Such a pattern is formed on the sheet S for each ink color and each dot size (small dot, medium dot, large dot). Symbols affixed to patterns of individual colors in FIG. 4 denote respective ink colors, and words within parentheses represent dot sizes. For example, C (SMALL) represents a small-dot pattern of cyan, and K (LARGE) represents a large-dot pattern of black. Although a pattern is formed on the sheet S for each dot size according to the embodiment, a pattern with a mixture of a plurality of dot sizes may be formed. Although six test patterns are aligned in the moving direction, which is not restrictive, the number of test patterns to be aligned may be changed according to the type and/or size of the sheet S. For example, more than six test patterns may be aligned in the moving direction. Further, the sizes of the patches P2 to P254 may be changed according to the sizes of the patches P1 and P255. This modification can allow many patterns to be arranged in the moving direction as much as possible, thus reducing the amount of the sheet S needed in the transporting direction.

Next, the operation of the compensation value acquiring routine will be described.

First, prior to printing an image to be printed, the user sets the sheet S in the printer 1, and designates the type and size of the sheet S via the user interface or the like of the computer (S201). The controller 60 alternately executes a path of ejecting inks while moving the head in the moving direction and the transportation operation of transporting the sheet S by a predetermined amount in the transporting direction under the conditions specified by the user, thereby printing a test pattern, as described above, on the sheet S according to the input gray-scale values of the image to be printed (S202). Next, when the test pattern printed on the sheet S is transported to a position facing the optical sensor 10, the controller 60 causes the optical sensor 10 to scan the test pattern at the time the head moves (S203). The measurement (detection) of the density is carried out with the optical sensor 10 (i.e., the read gray-scale value is acquired) in this manner. Then, the amount of deviation of each printed color (difference between the input gray-scale value and the read gray-scale value) is acquired based on the density detected by the optical sensor 10. Then, a conversion table specifying a compensation value to compensate for the amount of deviation is prepared (S204), and is stored in the memory 63 or the like of the printer 1 (S205). At the time of printing the image to be printed on the sheet S, printing is executed while compensating for the amount of deviation (i.e., changing the read gray-scale value to the input gray-scale value) using the conversion table. This procedure can ensure printing with adequate colors.

Measurement Results

In the calibration using the test pattern according to the embodiment, the width of each of the patches P2 to P254 in the moving direction is smaller than the spot size of the optical sensor 10, but continuous density data sampled at finer periods is acquired in the moving direction by the optical sensor 10, so that the optical sensor 10 achieves highly accurate measurement.

Figure 5:
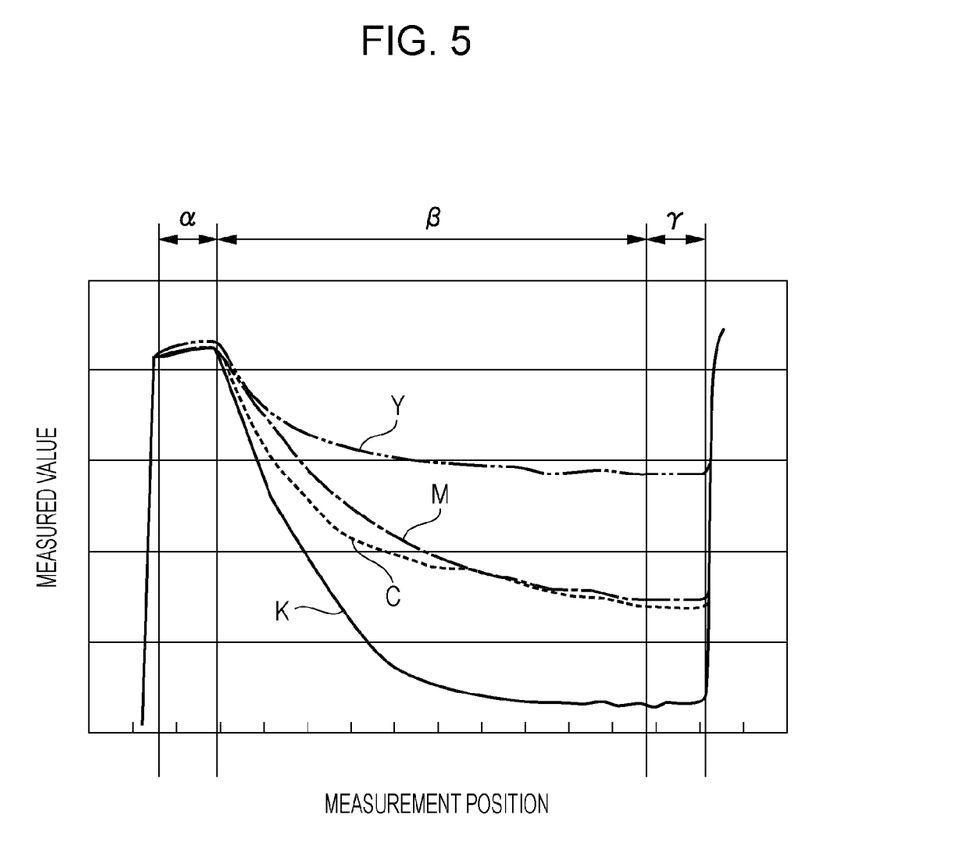
FIG. 5 is a diagram showing the results of measuring the test pattern.

FIG. 5 is a diagram showing the results of measuring the test pattern. FIG. 5 shows measurement results, among some colors, for four colors of YMCK. The abscissa in FIG. 4 represents the position (measurement position) of each pattern in the moving direction, and the ordinate represents the measured value (gray-scale value) of each pattern. The measured value is equivalent to the reflectance of light irradiated on the sheet S. An area indicated by $\alpha$ represents a range where the spot size is included in the patch P1, and an area indicated by $\gamma$ represents a range where the spot size is included in the patch P255. Further, an area indicated by $\beta$ represents a gradation portion (P2 to P254). It is apparent that the reflectance gets lower from the patch P1 to the patch P255, i.e., the patch density is increasing. Areas outside $\alpha$ and $\gamma$ in FIG. 4 are influenced by the surrounding of the test pattern (i.e., influenced by the adjacent test pattern and the base of the sheet).

It is apparent from FIG. 4 that the measured values at both end portions (P1, P255) are stable for each color, and the measured values are varying smoothly in the area $\beta$ between the end portions. It is also apparent that the range of a change in measured value (difference between the maximum value and the minimum value) varies among some colors. Specifically, the range of a change in black is the largest, and becomes smaller in the order of cyan, magenta and yellow. As apparent from the measurement results, with the test pattern according to the embodiment being formed, the optical sensor 10 provides density data sampled continuously at finer periods, thus achieving highly accurate measurement.

According to the embodiment, as described above, the patches at both ends of the test pattern in the moving direction (i.e., the maximum value and the minimum value) are formed greater than the spot size of the optical sensor 10. In addition, a plurality of patches between the end patches in the moving direction are set in such a way that the widths of the patches are smaller than the spot size of the optical sensor 10 and the gray-scale values vary continuously. Measurement of the density with such a test pattern formed allows the optical sensor 10 to acquire continuous density data sampled at finer periods, resulting in achievement of highly accurate measurement. This makes it possible to achieve both reduction in the print area of the test pattern and high accuracy in density measurement.

Other Embodiments

Although the printer as one exemplary embodiment, the printing method therefor, etc. have been described, it should be understood that the embodiment is presented for ease of understanding the invention, and the invention should not be construed as restrictive. The invention may be modified and improved without departing from the scope of the invention, and should include equivalents of the modifications and improvements. Particularly, the invention includes embodiments to be described below.

Printers

Although the printer has been described as one example of the printing apparatus in the foregoing description of the embodiment, the printing apparatus is not restrictive. For example, techniques similar to the technique of the embodiment may be adapted to various other apparatuses to which the ink jet technique is applied, such as a color filter manufacturing apparatus, a dyeing apparatus, a microfabrication apparatus, semiconductor manufacturing equipment, a surface treating apparatus, a three-dimensional article forming apparatus, a liquid vaporizer, an organic EL manufacturing apparatus (particularly, polymer EL manufacturing apparatus), a display manufacturing apparatus, a film deposition apparatus, and a DNA chip manufacturing apparatus.

Although the printer (what is called "ink jet printer") that ejects ink to print an image has been described as the embodiment by way of example, the embodiment may be a color laser printer that forms an image on a medium using toners of a plurality of colors.

Ink Ejection Scheme

The scheme of ejecting inks from the nozzles may be a scheme of ejecting inks using piezoelectric elements, or a scheme of thermally generating bubbles in the nozzles. Other ink ejection schemes may be used as well.

Inks

Although seven types of inks are used according to the embodiment, other types of inks may be used. For example, a metallic ink may be used. Note that the metallic ink is an ink which provides a print-out with metallic texture. For example, an oil-based ink composition containing a metal pigment, an organic solvent and a resin can be used as such a metallic ink. To effectively provide visually metallic texture, it is preferable that the metal pigment should be flat particles, and it is preferable that a 50% mean particle size R50 equivalent to the diameter of a circle obtained from the area of an X-Y plane of the flat particle should be 0.5 to 3 μm, and the condition of R50/Z>5 where X is the long diameter of the plane of the flat particle, and Y is the short diameter thereof, and Z is the thickness of the flat particle. Such a metal pigment may be formed from, for example, aluminum or an aluminum alloy, or may be formed by crushing a metallized film. The density of the metal pigment contained in the metallic ink can be set to, for example, 0.1 to 10.0 wt %. Of course, the metallic ink is not limited to such a composition, and other compositions may be used as needed as long as the compositions provide metallic texture.

In case of forming a test pattern using such a metallic ink, the gray-scale value hardly varies in a high-density area. Further, the relationship between the amount of ejected ink and the density may be reversed in a high-density area. In case of using a metallic ink, therefore, it is desirable that a high-density area should not be used to make the number of patches smaller than the number (gray-scale values 1 to 255) set according to the embodiment. For example, it is desirable to set the gray-scale values to 1 to 60 or so. This setting can reduce consumption of inks and the sheet by an amount corresponding to the gray-scale values for which the test pattern is not formed. In this case, the widths of the patch with the input gray-scale value of 1 and the patch with the input gray-scale value of 60 in the moving direction may be set greater than the spot size of the optical sensor 10, and the widths of the patches with the input gray-scale values of 2 to 59 in the moving direction may be set smaller than the spot size of the optical sensor 10. With regard to the gray-scale values of 61 to 255, the density compensation values may be acquired through interpolation. The modification such that the gray-scale values of patches to be formed are set less than 255 is not limited to a test pattern using a metallic ink, and may be applied to other colors if compensation values to be used in printing cannot be acquired from the measurement results for some reason.

Optical Sensor

Although the optical sensor 10 is configured to include the light emitting section 10a and the light receiving section 10b according to the embodiment, it is not restrictive. For example, the optical sensor 10 may be configured into a light emitting device and a light receiving device as separate components. In this case, the light emitting device and the light receiving device should be separately mounted on the carriage.

Although the individual patches of the test pattern are formed along the moving direction, and are sampled at fine periods at the time of moving the head according to the embodiment, the individual patches of the test pattern may be formed along the transporting direction, and may be sampled at fine periods at the time of transporting a sheet. In this case, the optical sensor may be adapted not only to a what is called "serial scanning printer" according to the embodiment, but also to, for example, a what is called "line scanning printer" that forms an image while transporting a sheet to the fixed head. In addition, reading of the gray-scale values of the individual patches can be made faster by forming the individual patches of a test pattern along whichever direction the movement is faster, the direction of sheet transportation or the direction of head movement.

Width of Test Pattern

Although the widths (lengths in the moving direction) of the individual test patterns are identical regardless of the color in FIG. 4, the widths of the patches P2 to P254 may be changed according to the color. For example, the width of a yellow patch which has a small range of a change may be set to the largest (e.g., 2 mm), and the widths of patches of the other colors may be set smaller (e.g., 1 mm) than the width of the yellow patch. This setting can make the reading accuracy stable according to the color, and can reduce consumption of inks and the sheet by the narrowed amount of the patch width.

The width of a test pattern may be changed by changing the number of patches (i.e., the number of gray-scale values). That is, the number of patches may be set greater for a color which results in a large change in measured value at both end portions of a test pattern. For example, the number of patches of a first test pattern of a color which provides a first difference between measured values at both end portions of the test pattern may be set greater than the number of patches of a second test pattern of a color which provides a second difference between measured values at both end portions of the test pattern smaller than the first difference. Alternatively, 256 gray scales may be set for yellow, and 128 gray scales which are obtained by picking every other gray scales in the 256 gray scales. This modification can reduce consumption of inks and the sheet by the reduced number of patches.

Patches at Both End Portions

Although both ends of a test pattern have the same size according to the embodiment, they may have different sizes as long as the sizes are greater than the spot size of the optical sensor 10.

Although the patches P1 and P255 at both ends of a test pattern are formed to have the same gray-scale value according to the embodiment, the patches are not restrictive. For example, the patch P1 may be formed to have alternate alignment of areas with gray-scale values (gray-scale value of 1 and gray-scale value of 2) close to that of the patch P1. The same is applied to the patch P255. Even with this patch design, the gray-scale values of the patches P1 and P255 can be regarded as substantially the same gray-scale value, so that the density can be measured accurately.

Patches Interposed Between Patches at Both Ends

Although the widths of the patches P2 to P254 in the moving direction are set to 1 mm in consideration of the sampling period of the optical sensor 10 and the moving speed of the head according to the embodiment, the widths of the patches P2 to P254 in the moving direction are not restrictive. Each of the widths of the patches P2 to P254 in the moving direction should be equal to the sampling period, and may be varied according to, for example, the moving speed of the head. In addition, the widths of the patches P2 to P254 in the moving direction may be set greater than the sampling period, and sampling may be performed multiple times for each patch, as long as they are smaller than the spot size of the optical sensor 10. This modification can ensure highly accurate measurement of the densities of the patches P2 to P254.

Colorimeter

Although the optical sensor 10 is mounted on the carriage according to the embodiment, a colorimeter may be additionally mounted on the carriage or the printer to perform color calibration. In this case, the number of patches (i.e., the number of gray-scale values) of a test pattern for performing density calibration with the optical sensor in the embodiment may be set greater than the number of patches (i.e., the number of gray-scale values) of a test pattern for performing color calibration with the colorimeter. This can permit density calibration to be accurately performed with the optical sensor.

The entire disclosure of Japanese Patent Application No. 2011-158128, filed Jul. 19, 2011, 2011-285311, filed Dec. 27, 2011 and 2012-104695, filed May 1, 2012 are expressly incorporated by reference herein.

What is claimed is:

1. A printing method comprising:
    forming on a medium a test pattern including a first patch with a first gray-scale value, a second patch with a second gray-scale value, and a plurality of patches interposed between the first patch and the second patch and having gray-scale values varying between the first gray-scale value and the second gray-scale value in such a way that the patches are aligned in a predetermined direction;
    scanning the test pattern with an optical sensor along the predetermined direction; and performing density compensation based on a result of scanning the test pattern,
wherein widths of the first and second patches in the predetermined direction and widths thereof in an intersectional direction intersecting the predetermined direction are greater than a spot size of the optical sensor, and
the width of each of the plurality of patches in the intersectional direction is greater than the spot size, and the width of each of the plurality of patches in the predetermined direction is smaller than the spot size.

2. The printing method according to claim 1, further comprising:
forming a width-determining pattern at least one of whose width in the predetermined direction and whose width in the intersectional direction changes gradually;
scanning the width-determining pattern with the optical sensor along the predetermined direction; and
respectively determining widths of the test pattern which correspond to the first patch or the second patch based on a result of scanning the width-determining pattern.

3. The printing method according to claim 2, wherein the width-determining pattern is formed with an ink of a color other than a color which provides a smallest range of a change in the result of scanning with the optical sensor among a plurality of inks to be used in printing.

4. The printing method according to claim 1, wherein the individual widths of the first patch and the second patch are changed according to a type of the medium.

5. The printing method according to claim 1, wherein the test pattern is formed for each of inks of a plurality of colors, and
a number of the plurality of patches is changed among some colors.

6. The printing method according to claim 1, wherein the test pattern is formed for each of a plurality of dot sizes.

7. The printing method according to claim 1, wherein a plurality of test patterns are formed in alignment in the predetermined direction, and
a number of the plurality of test patterns aligned in the predetermined direction is changed according to a type or a size of the medium.

8. The printing method according to claim 1, wherein the test pattern is formed for each color of inks of a plurality of colors, and
the widths of the plurality of patches in the predetermined direction are changed among some colors.

9. The printing method according to claim 1, wherein the test pattern is formed for each of inks of a plurality of colors, and
at least one of the first gray-scale value and the second gray-scale value is changed among some colors.

10. The printing method according to claim 1, wherein a number of gray-scale values of the test pattern scanned by the optical sensor is greater than a number of gray-scale values of a pattern for colorimetry with a colorimeter.

11. The printing method according to claim 1, wherein the width of each of the plurality of patches in the intersectional direction is greater than a width corresponding to a sampling period of the optical sensor.

12. A printing apparatus comprising:
a head that ejects an ink;
an optical sensor; and
a controller that controls the head and the optical sensor,
wherein the head forms a test pattern including a first patch with a first gray-scale value, a second patch with a second gray-scale value, and a plurality of patches interposed between the first patch and the second patch and having gray-scale values varying between the first gray-scale value and the second gray-scale value is formed on a medium in such a way that the patches are aligned in a predetermined direction,
the optical sensor scans the test pattern along the predetermined direction,
the controller carries out printing based on a result of density compensation performed by a result of scanning the test pattern,
widths of the first and second patches in the predetermined direction and widths thereof in an intersectional direction intersecting the predetermined direction are greater than a spot size of the optical sensor, and
the width of each of the plurality of patches in the intersectional direction is greater than the spot size, and the width of each of the plurality of patches in the predetermined direction is smaller than the spot size.

13. The printing apparatus according to claim 12, wherein the individual widths of the first patch and the second patch are changed according to a type of the medium.

14. The printing apparatus according to claim 12, wherein the test pattern is formed for each of inks of a plurality of colors, and
a number of the plurality of patches is changed among some colors.

15. The printing apparatus according to claim 12, wherein the test pattern is formed for each of a plurality of dot sizes.

16. The printing apparatus according to claim 12, wherein a plurality of test patterns are formed in alignment in the predetermined direction, and
a number of the plurality of test patterns aligned in the predetermined direction is changed according to a type or a size of the medium.

17. The printing apparatus according to claim 12, wherein the test pattern is formed for each color of inks of a plurality of colors, and
the widths of the plurality of patches in the predetermined direction are changed among some colors.

18. The printing apparatus according to claim 12, wherein the test pattern is formed for each of inks of a plurality of colors, and
at least one of the first gray-scale value and the second gray-scale value is changed among some colors.

19. The printing apparatus according to claim 12, wherein a number of gray-scale values of the test pattern scanned by the optical sensor is greater than a number of gray-scale values of a pattern for colorimetry with a colorimeter.

20. A non-transitory computer-readable medium recording a program allowing a computer to execute the printing method of claim 1.

* * * * *